United States Patent [19]
Takami et al.

[11] Patent Number: 4,737,807
[45] Date of Patent: Apr. 12, 1988

[54] FILM REWINDING DEVICE FOR CAMERA

[75] Inventors: Satoshi Takami; Yutaka Ohsawa, both of Tokyo, Japan

[73] Assignee: Asahi Kogaku Kogyo Kabushiki Kaisha, Tokyo, Japan

[21] Appl. No.: 71,950

[22] Filed: Jul. 10, 1987

[30] Foreign Application Priority Data

Jul. 11, 1986 [JP] Japan ............................ 61-105567[U]

[51] Int. Cl.$^4$ .............................................. G03B 1/12
[52] U.S. Cl. .................................................. 354/173.1
[58] Field of Search ........................... 354/173.1, 173.11

[56] References Cited

U.S. PATENT DOCUMENTS 4,637,702  1/1987  Kazami et al. .................. 354/173.11

Primary Examiner—Michael L. Gellner
Attorney, Agent, or Firm—Sughrue, Mion, Zinn, Macpeak & Seas

[57] ABSTRACT

A film rewinding device for a camera in which the rewind switch need only be momentarily depressed to initiate the rewinding operation. The rewind switch is a type which remains depressed after momentary activation. Activation of the rewind switch produces a first signal which is ANDed with a second signal which is present when the camera is in a normal state and it is possible to perform a rewinding operation. When both the first and second signals are active, a switching circuit applies power to a control section to effect the rewinding operation. The completion of the rewinding operation is detected by sensing the movement of the film. When the rewinding operation has been completed, the second signal is deactivated, thereby removing power from the control circuitry. The rewind switch is opened when the rear cover is opened.

7 Claims, 2 Drawing Sheets

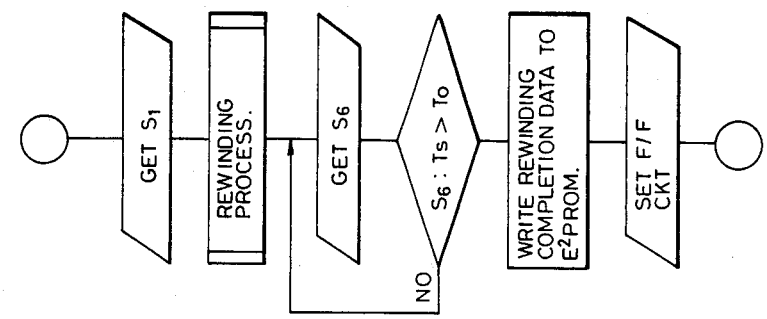
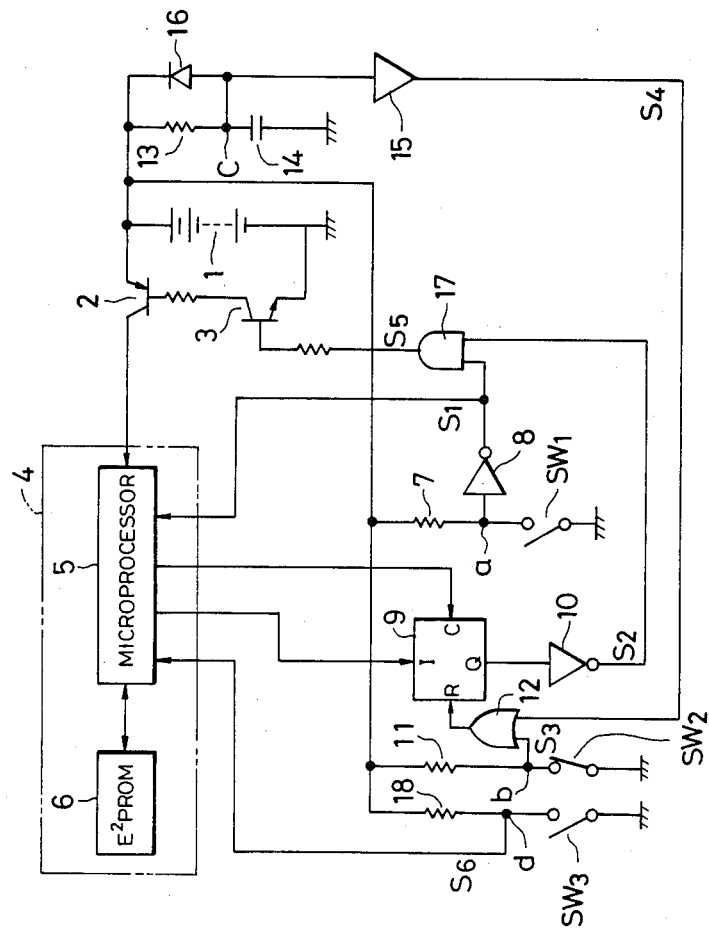

FILM REWINDING DEVICE FOR CAMERA

BACKGROUND OF THE INVENTION

The present invention relates to a film rewinding device for a camera in which camera control operations such as the photometric operation, exposure control operation, film winding operation and film rewinding operation are carried out by the execution of a microprocessor program.

A camera using a microprocessor is well known in the art in which camera control operations such as the photometric operation and exposure control operation are performed by the execution of a microprocessor program. Such a camera has a motor-driven film conveying mechanism which is controlled by the microprocessor. The film is automatically wound with this mechanism.

To rewind the film, the film rewind button is held depressed. The depression of the rewind button closes a rewind switch through which electric power is supplied to the film conveying mechanism. The film rewind button must be maintained depressed until the film has been completely rewound.

Holding down of the film rewind button until completion of the film rewinding operation is inconvenient to the operator of the camera. Therefore, it is desirable that the camera be designed so that the film rewinding operation can be accomplished by only momentary depression of the rewind button. This requirement may be achieved by the provision of a mechanism with which the rewind switch is held continuously closed after only momentary depression of the rewind button. However, this arrangement results in the requirement for another operation; that is, releasing the rewind switch upon completion of the film winding operation. Furthermore, if the operator forgets to open the rewind switch, electric power will be wasted because power will be supplied to the camera control section, including the motor mechanism and the microprocessor, until the rewind switch is opened.

In view of the foregoing, an object of the present invention is to provide a film rewinding device which accomplishes film rewinding with the rewinding switch operated only momentarily.

SUMMARY OF THE INVENTION

The foregoing and other objects of the invention have been achieved by the provision of a film rewinding device for a camera which is controlled by the execution of microprocessor program in which, according to the invention, an electric power supply circuit for a film rewinding operation comprises: switching means for electrically connecting a camera control section to an electric power source; first signal generating means including a rewind switch which is placed in a second state from a first state to output a first signal when operated and which is then mechanically held in the second state; second signal generating means for producing a second signal when the second signal generating means is in its normal state; gate means which is opened upon reception of the first and second signals to provide an output which renders the switching means conductive to allow the supply of electric power for film winding operations; detection response means including a detecting switch for detecting the completion of a film winding operation to provide a detection signal, the detection response means changing the state of the second signal generating means in response to the detection signal to prevent the production of the second signal to render the switching means nonconductive; and means for changing the state of the rewind switch to the first state from the second state, and thereafter restoring the state of the second signal generating means to the normal state.

In the film rewinding device of the invention, the second signal generating means produces the second signal in the normal state, the state from which the film can be rewound, in advance. Under this condition, the state of the rewind switch is changed from the first state to the second state to produce the first signal. Upon reception of the first and second signals, the gate means provides an output which renders the switching means between the camera control section and the electric power source conductive, thereby permitting the supply of electric power for a film rewinding operation.

When the detecting switch detects the completion of the film rewinding operation, the detection response means operates to prevent the production of the second signal, and therefore the switching means is rendered non-conductive with the gate means closed.

The detection response means inhibits the production of the second signal in the presence of the first signal, that is, when the rewind switch is in the second state. When the rewind switch is placed in the first state again to eliminate the first signal, the inhibition of the production of the second signal is eliminated; that is, the second signal is produced again.

With the film rewind device thus constructed, the film will be rewound to the end merely by momentarily operating the film rewind switch, and the supply of electric power is interrupted substantially at the same time the rewinding operation is accomplished.

BRIEF DESCRIPTION OF THE DRAWINGS

FIG. 1 is a circuit diagram of a power supply circuit in a film winding device constructed in accordance with a preferred embodiment of the present invention;

FIG. 2 is a flowchart used for a description of the operation of a microprocessor in a camera control section of the film winding device of the invention.

DESCRIPTION OF THE PREFERRED EMBODIMENTS

Figure 3:
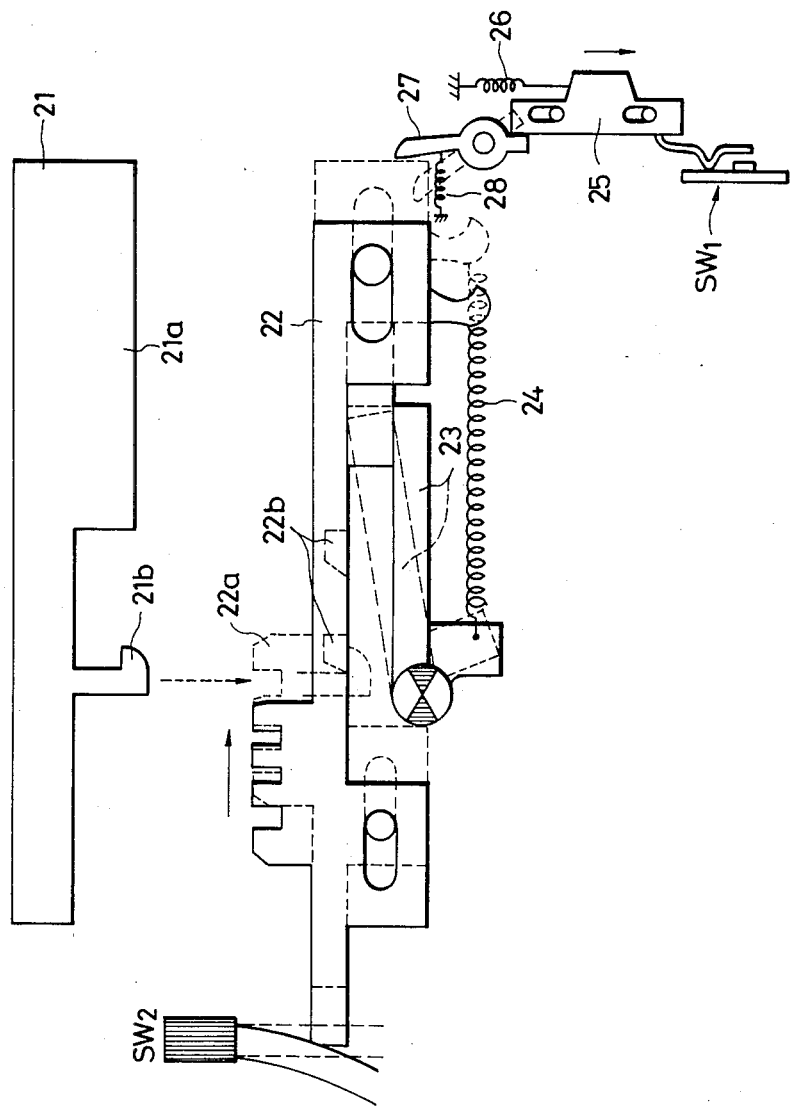
FIG. 3 is a plan view showing a rewind switch and an operating mechanism associated with the rear cover of a camera.

A preferred embodiment of the invention will be described with reference to the accompanying drawings.

FIG. 1 is a circuit diagram showing a power supply circuit forming a film rewinding device. In FIG. 1, reference numeral 1 designates an electric power source, namely, a battery, and reference numerals 2 and 3, transistors forming a switching circuit connected between the power source 1 and a camera control section 4. The camera control section 4 includes various elements and circuits, such as a photometric circuit and an exposure control circuit, necessary for camera control.

The camera control section 4 further includes a conventional $E^2PROM$, namely an I/O memory 6 for storing film rewind completion data. The I/O memory 6 supplies a set signal to an flip-flop 9 when instructed by the program of the microprocessor 5, thereby rendering the switching circuit nonconductive in specific cases, for instance, when the battery 1 is replaced immediately after the film has been rewound. The I/O memory 6 will be described below in more detail.

Further in FIG. 1, $SW_1$ designates a rewind switch, which forms a first signal generator together with a resistor 7 connected in series therewith and an inverter 8 whose input terminal is connected to the connecting point of the switch $SW_1$ and the resistor 7. The series circuit of the rewind switch $SW_1$ and the resistor 7, as shown in FIG. 1, is connected to the power source 1. When the switch $SW_1$ is closed, a signal at the logic level "1" is outputted, as a first signal $S_1$, by the inverter 8. The first signal $S_1$ is applied to a gate circuit (described below) and supplied, as an instruction signal, to the microprocessor 5 to start the film rewinding operation. The rewind switch $SW_1$ is designed so that the armature can be manually moved from the open position to the closed position with the operator's finger and then is mechanically held at the closed position. It is returned to the open position when the rear cover of the camera is opened.

Further in FIG. 1, the flip-flop 9 forms a second signal generator together with an inverter 10. The flip-flop 9 is reset by a normally closed reset switch $SW_2$, the armature of which is moved to the open position when the rear cover of the camera is opened. The reset switch $SW_2$ is connected through a resistor 11 to the power source 1. When the rear cover is opened, the reset switch $SW_2$ is opened, as a result of which a high logic level voltage "H" is applied at the connecting point b of the switch $SW_2$ and the resistor 11. This "H" voltage is applied as a first reset signal $S_3$ to the flip-flop 9 through an OR gate 12.

Accordingly, when the rear cover of the camera is closed after the film has been loaded, that is, when the camera is in the "normal" state and the film can be rewound, the output terminal Q of the flip-flop 9 is set to the "0" logic level. The "0" output level at the output terminal Q is held until the film rewinding operation has been completed, regardless of the amount of film wound or unwound. Accordingly, during this time the inverter provides a "1" output as the second signals $S_2$.

A second reset signal is applied through the OR gate 12 to the flip-flop 9 to reset the latter. The second reset signal $S_4$ is generated by applying to a buffer 15 an integration voltage developed at the connection point of a capacitor 14 and a resistor 13 connected at its other terminal to the power source 1. The buffer 15 may be implemented with a conventional device such as waveform-shaping Schmitt trigger circuit. A diode 16 shunting the resistor 13 provides a path for discharging the capacitor 14.

When a battery is first placed in the camera or the battery is replaced, the second reset signal $S_4$ is produced to reset the flip-flop 9 so that the output terminal Q is held at "0".

On the other hand, when the flip-flop 9 is set by a "1" signal outputted by the microprocessor 5, raising the output terminal Q to the "1" level, generation of the second signal $S_2$ is stopped. The flip-flop is then set by supplying a clock pulse to its clock terminal C with a "1" signal applied to its set terminal I.

Further in FIG. 1, reference numeral 17 designates an AND gate. The AND gate 17 receives the first and second signals $S_1$ and $S_2$ and produces in response a gate output signal $S_5$, which is applied to the base of the biasing transistor 3 in the switching circuit described above. When the signal $S_5$ is in the "1" (or "H") state, the transit 3 is turned on.

Still further in FIG. 1, $SW_3$ designates a detecting switch which is opened and closed with a predetermined period as the film is being rewound. At the end of the film rewinding operation, the periodic on/off operation of the switch $SW_3$ is stopped with its armature held at either the open or closed position. Thus, the completion of the film winding operation can be detected by detecting the suspension of the periodic on/off operation of the switch $SW_3$. The detecting switch $SW_3$, together with a resistor 18 and the microprocessor 5, forms a detection response circuit.

As shown in FIG. 1, the detecting switch $SW_3$ is connected through the resistor 18 to the power source 1. The detecting switch is repeatedly opened and closed during the film rewinding operation. Accordingly, a voltage pulse is produced at the connecting point d of the switch $SW_3$ and the resistor 18 at a predetermined period during the film rewinding operation. At the end of the film rewinding operation, the repetitive on/off operation of the detecting switch $SW_3$ is stopped, whereupon the voltage at the connecting point d is maintained at a constant "H" or "L" level. The voltage developed at the connecting point d, as described above, is supplied as a detecting signal $S_6$ to the microprocessor 5. When the period of the detection signal $S_6$ exceeds a predetermined value, the microprocessor 5 supplies a "1" signal as a set signal to the flip-flop 9. That is, the program for the microprocessor determines when the period $T_5$ of the voltage pulse provided at the connecting point d during the film rewinding operation exceeds a predetermined value $T_0$, whereupon the flip-flop 9 is set.

The detecting switch $SW_3$ is operated for example, by rotation of a sprocket which is rotated as the film is rewound. Otherwise, an optical switch which senses the passing of the film's perforations can be used.

The operation of the film rewinding device constructed as described above will be described with reference to the case where the film has already been wound.

When the rewind switch $SW_1$ is open, no "1" signal will be present at the connecting point a, and hence the first signal $S_1$ will be in the "0" state. Accordingly, the output of the AND gate 17 is a "0" and the transistors 2 and 3 are off. That is, the camera control section 4 is electrically disconnected from the power source 1. The second signal $S_2$ is, however, in the "1" state because the output terminal Q of the flip-flop 9 is held at "0", as described above.

When the rewind switch $SW_1$ is closed, its armature is held at the "closed" position. As a result, the signal at the connecting point a is set to "0" and the first signals $S_1$ at the output of the inverter 8 is set to "1". Accordingly, with two "1"s on its two inputs, the AND gate 17 outputs a "1" and the transistor 3 is rendered conductive, thus also turning on the transistor 2. As a result, the camera control section 4 is electrically connected to the power source 1, and the rewinding instruction is applied to the microcomputer 5. Upon energization of the camera control section, a film conveying motor mechanism starts rewinding the film as instructed by the microprocessor 5.

When the film rewinding operation is started in this manner, the voltage pulse train detection signal $S_6$ is supplied to the microprocessor 5. When it is detected that the film rewinding operation has been completed by sensing the period of the detection signal $S_6$ in the manner described above, a "1" signal is applied to the set terminal I of the flip-flop 9 to set the latter. At the same time, the film rewinding operation completion data is written into the I/O memory 6. When the flip-flop 9 is set, its output terminal Q is raised to the "1" level, and hence the second signal $S_2$ is returned to "0". Therefore, the AND gate 17 outputs a "0", turning off the transistors 2 and 3 in that order.

When the film rewinding operation has been completed, the camera control section is disconnected from the power source 1. As long as the rear cover is closed, the reset switch $SW_2$ will remain closed, and therefore the second signal remains in the "0" state, holding off the supply of power from the source 1. When the rear cover is subsequently opened, the rewind switch $SW_1$ is opened, setting the switch $SW_1$ to the "0" state. The switch $SW_2$ is also opened. When the switch $SW_2$ is opened, the signal at the output terminal Q is set to "0", whereupon the inverter produces a "1" level for the second signal $S_2$ again.

Although the second signal is a "1", the AND gate 17 remain closed since the first signal $S_1$ is in the "0" state. Therefore, the transistors 2 and 3 remain off. Even when the rear cover is closed, the rewind switch $SW_1$ will be held open, maintaining the switching circuit in the open condition.

If the battery is replaced after the completion of a film winding operation but before the rear cover is opened to remove the film, the switching circuit will remain in the open state. When the battery is replaced, the second reset signal $S_4$, which is generated in response to the integration voltage at the connection point c of the resistor 13 and the capacitor 14, will to to a "1", resetting the flip-flop 9. As a result, the second signal $S_2$ is set to a "1" and the AND gate 17 is then opened, rendering conductive the switching circuit. At this time, the microprocessor 5 reads the film rewinding instruction data from the I/O memory 6 and supplies a "1" signal to the flip-flop 9 to again set the latter. As a result, the second signal $S_2$ is returned to the "0" state, turning off the transistor 3 and consequently the transistor 2.

The winding operation data stored in the I/O memory 6 is erased according to the operation program for the microprocessor 5.

FIG. 2 is a flowchart showing the operation of the microprocessor with the first signal $S_1$ and the detection signal $S_6$ in the "1" state.

In the preferred embodiment described above the rewind switch $SW_1$ is opened in association with the opening of the rear cover of the camera. However, the rewind switch $SW_1$ may be restored manually if desired.

Referring now to FIG. 3, the mechanical arrangement of the switches $SW_1$ and $SW_2$ will now be described. FIG. 3 illustrates the rear cover 21 and a rear cover opening member 22 provided in the camera body. The rear cover opening member 22 is slidably moved in a horizontal direction in FIG. 3 by manual operation of a member 22a.

When the rear cover 21 is closed, the rear cover opening member 22 is positioned so that an end portion of the member 22 contacts the operating arm of the switch $SW_2$. In this case, an engaging member 21b of the rear cover 21 engages a receiving member 23b of the rear cover opening member 22, and the rear cover opening member 22 is biased toward the switch $SW_2$ by a biasing spring 24, whereby the switch $SW_2$ is maintained closed.

When the member 22a is manually moved rightward in FIG. 3 to open the rear cover 21, the engagement of the member 21b and the receiving member 22b is released, allowing a stop 23 to rotate in the counterclockwise direction under the force of the spring 24. The end portion of the stop 23 comes into abutment with the rear cover opening member 22, as depicted in FIG. 3, and the member 22 is held at that position.

When the rear cover 21 is closed the portion 21a pushes the stop 23 downwardly, releasing the abutment of the stop 23 and the rear cover opening member 22, whereupon the engaging member 21b is received by the member 22b to keep the cover 21 closed.

The switch $SW_2$ is an ordinary switch capable of carrying out its switching operation in response to the opening of the rear cover.

The switch $SW_1$ is also an ordinary switch which is provided in the camera body. When a rewind switch operating member 25 is manually moved downwardly in FIG. 3 to turn-on the rewind switch $SW_1$, the engagement of the member 25 and a latch 27 is released, allowing the latch 27 to rotate in a counterclockwise direction under the force of a spring 28. Then the latch 27 is positioned as indicated by a dotted line in FIG. 3 to maintain the switch $SW_1$ closed. When the member 22 is slidablely moved as indicated by an arrow in FIG. 3 to open the rear cover 21, the right end portion of the member 22 pushes the latch 27 so that the latch 27 rotates in a clockwise direction and the latch 27 is returned under the force of a spring 26 to the position indicated by a solid line in FIG. 3.

An example of the switch $SW_3$ is disclosed in Japanese Laid-Open Patent applications Nos. 83827/1983 and 141630/1982. (The switch $SW_3$ corresponds to a switch $SW_6$ of Application No. 83827/1983 and to a switch $SW_2$ of Application No. 141630/1982.)

The invention has been described with specific reference to a film rewinding power supply circuit. Of course, in practice there is also provided a photometric circuit, an exposure control circuit, etc., and power supply circuits are also provided therefor.

As described above, in the film rewinding device of the invention, once the rewind switch is operated to set it to the second (closed) state, even when the rewind switch is released, the camera control section will be maintained connected to the power source to allow the rewinding of the film to be completed. Thus, the film rewinding device of the invention provides a simpler operation than the prior art device in which the film rewind switch must be continuously depressed until the rewinding operation has been completed.

Furthermore, in the film rewinding device of the invention, the supply of power to the camera control section is automatically stopped when the film rewinding operation has been completed. Therefore, even if the camera is put away without restoring the rewind switch to the first state, the drain on the power source is negligibly small. This makes it possible to design the camera so that the rewind switch is restored in association with the opening to the rear cover.

What is claimed is:

1. A film rewinding device for a camera, comprising:
   an electric power source;
   switching means for electrically connecting a camera control section to said electric power source, said control section when energized effecting a film rewind operation;

first signal generating means comprising rewind switch means, said rewind switch means having first and second states, said rewind switch means being placed in said second state from said first state when operated and then is mechanically held in said second state, said first signal generating means producing a first signal in an active state when said rewind switch means is in said second state;

second signal generating means for producing a second signal in an active state when a rewind operation is possible;

control means operating in response to said first and second signals for producing a third signal rendering said switching means conductive to allow supply of electric power to said control section for effecting a film rewinding operation when said first and second signals are in said active state; and means for detecting completion of a film rewinding operation, said detecting means deactivating said second signal to render said switching means nonconductive.

2. The film rewinding device of claim 1, wherein said rewinding switch means comprises a switch which can be manually operated to place it in said second state from said first state and which is placed in said first state from said second state when a rear cover of said camera is opened.

3. The film rewinding device of claim 2, wherein said first signal generating means further comprises a resistor connected in series with said rewinding switch means and an inverter having an input coupled to a junction between said resistor and said rewinding switch means, the series combination of said rewinding switch means and said resistor being connected across said electric power source.

4. The film rewinding device of claim 2, wherein said second signal generating means comprises a flip-flop and a reset switch opened and closed when said rear cover is respectively opened and closed, said flip-flop having a reset input coupled to said switch so that said flip-flop is reset when said rear cover is opened.

5. The film rewinding device of claim 4, further comprising integration circuit means for producing a reset signal a predetermined time after said electric power source is installed or replaced, and further comprising OR gate means having an output coupled to a reset input of said flip-flop, a first input coupled to said reset switch, and a second input coupled to an output of said integration circuit.

6. The film rewinding device of claim 2, wherein said detecting means comprises switch means opened and closed as said film is rewound.

7. The film rewinding device of claim 1 further comprising a memory means to store data representing the completion of the film rewinding operation therein, which is detected by said detecting means.

* * * * *